(12) United States Patent
Mo

(10) Patent No.: US 11,370,334 B2
(45) Date of Patent: Jun. 28, 2022

(54) ROTATABLE SAFETY SEAT AND CARRIER

(71) Applicant: Bambino Prezioso Switzerland AG, Steinhausen (CH)

(72) Inventor: Xiao-Long Mo, Guangdong (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 0 days.

(21) Appl. No.: 17/016,405

(22) Filed: Sep. 10, 2020

(65) Prior Publication Data
US 2021/0078463 A1 Mar. 18, 2021

(30) Foreign Application Priority Data

Sep. 12, 2019 (CN) .......................... 201910868432.7

(51) Int. Cl.
*B60N 2/28* (2006.01)
*A47D 1/00* (2006.01)
*B62B 9/10* (2006.01)
*F16H 21/16* (2006.01)
*B62B 7/14* (2006.01)

(52) U.S. Cl.
CPC ........... *B60N 2/2869* (2013.01); *A47D 1/002* (2013.01); *B60N 2/2821* (2013.01); *B60N 2/2848* (2013.01); *B62B 9/102* (2013.01); *F16H 21/16* (2013.01); *B62B 7/145* (2013.01)

(58) Field of Classification Search
CPC .. B60N 2/2869; B60N 2/2821; B60N 2/2848; B60N 2/28; B60N 2/062; B60N 2/071; A47D 1/002; B62B 9/102; B62B 7/145; F16H 21/16
See application file for complete search history.

(56) References Cited

U.S. PATENT DOCUMENTS

| | | | |
|---|---|---|---|
| 6,241,314 B1 | 6/2001 | Pufall | |
| 6,431,647 B2 * | 8/2002 | Yamazaki | B60N 2/286 297/256.12 |
| 6,793,283 B1 * | 9/2004 | Sipos | B60N 2/062 297/256.12 |
| 8,702,169 B2 * | 4/2014 | Abadilla | B60N 2/062 297/256.12 |

(Continued)

FOREIGN PATENT DOCUMENTS

| | | | | |
|---|---|---|---|---|
| DE | 102010021066 A1 * | 11/2011 | ............... | B60N 2/06 |
| DE | 102017205769 A1 * | 10/2018 | ............... | B60N 2/14 |
| EP | 2896534 A1 * | 7/2015 | ............... | B60N 2/14 |

*Primary Examiner* — Milton Nelson, Jr.
(74) *Attorney, Agent, or Firm* — Winston Hsu

(57) ABSTRACT

The present invention provides a rotatable safety seat includes a seat body, a seat base and a rotation component. The rotation component is slidably connected between the seat body and the seat base. The seat body is slid relative to the seat base via simultaneous shifting and rotation. The rotation component is slidably connected between the seat body and the seat base. During slid of the seat body, the seat body is shifted due to the slide, the seat body is shifted because of the slide, so as to move the seat body close to or away from the seat base; in the meantime, the seat body is rotated when being shifted, so that the infant or the child on the seat body is moved close to or away from the caretaker according to the actual demand. The present invention further provides a carrier with the rotatable safety seat.

14 Claims, 7 Drawing Sheets

(56) References Cited

U.S. PATENT DOCUMENTS

| | | | |
|---|---|---|---|
| 8,899,682 B2* | 12/2014 | Nilsson | A47C 3/18 |
| | | | 297/344.24 |
| 10,449,876 B2* | 10/2019 | Lonstein | B60N 2/2812 |
| 10,640,020 B2* | 5/2020 | Jung | B60N 2/2869 |
| 2004/0178669 A1* | 9/2004 | Lady | B60N 2/2845 |
| | | | 297/250.1 |
| 2006/0226685 A1 | 10/2006 | Priepke | |
| 2008/0252122 A1 | 10/2008 | Vallentin | |
| 2012/0264530 A1 | 10/2012 | Gilbert | |

* cited by examiner

ROTATABLE SAFETY SEAT AND CARRIER

BACKGROUND OF THE INVENTION

1. Field of the Invention

The present invention relates to a rotatable safety seat and a carrier, and more particularly, to a rotatable safety seat of simultaneously shifting and rotating a seat body relative to a seat base and a related carrier.

2. Description of the Prior Art

With an advanced awareness, an infant safety seat is widely used in the vehicle to provide sufficient protection for the child. The child cannot sit on the vehicle seat because the vehicle belt is unable to protect the child, so that the parents have to install the infant safety seat on the vehicle seat, and then the child sits on the infant safety seat to be belted by a safety belt of the infant safety seat. The conventional infant safety seat includes a seat body and a seat base. The seat body is rotatable above the seat base to adjust an angle of the seat body relative to the vehicle seat. However, the seat body is revolved on its own axle when being rotated above the seat base, and the rotated seat body is not linearly shifted relative to the seat base during rotation. If the parents intend to move the seat body toward a front side, a rear side, a right side or a left side of the infant safety seat, the seat body has to be further shifted, and then the seat body can be moved to foresaid position of the front side, the rear side, the right side or the left side. Thus, the conventional infant safety seat cannot shift and rotate the seat body at the same time, which results in drawbacks of complicated operation and elongated execution time, and design of an infant safety seat for simultaneous shifting and rotation is an important issue in a related mechanical industry.

SUMMARY OF THE INVENTION

The present invention provides a rotatable safety seat of simultaneously shifting and rotating a seat body relative to a seat base for solving above drawbacks.

The present invention provides a carrier with a rotatable safety seat having a seat body capable of being simultaneously shifted and rotated relative to a seat base, and therefore the seat body can be moved close to or away from a caretaker according to an actual demand.

According to the claimed invention, a rotatable safety seat includes a seat body, a seat base and a rotation component. The rotation component is engaged with the seat body and slidably connected on the seat base. The seat body is shifting and rotating on the seat base via a sliding movement of the rotation component.

According to the claimed invention, the rotation component includes a first movable end and a second movable end linked with and spaced from each other. The seat body is slidably connected with the seat base via engaging with the first movable end and the second movable end. The first movable end and the second movable end are linked but not close neighbors, which means the first movable end is spaced from the second movable end, and the slide of the seat body relative to the seat base provides stable and smooth reliability.

According to the claimed invention, a motion path of the first movable end is crossed by a motion path of the second movable end. Due to crossed design of the motion paths, the first movable end and the second movable end which are linked can be simply and practically rotated and slid when passing through a crossed section between the two motion paths.

According to the claimed invention, the rotation component includes a first sliding portion and a second sliding portion. The first sliding portion is slidably disposed on the seat base to be the first movable end. The second sliding portion is slidably disposed on the seat base to be the second movable end. The first sliding portion is linked with the second sliding portion.

According to the claimed invention, the first sliding portion is preferably engaged with the seat base in a slidable manner.

According to the claimed invention, the second sliding portion is preferably engaged with the seat base in a slidable manner.

According to the claimed invention, the rotation component further includes a first slide rail and a second slide rail. The first sliding portion is engaged with the first slide rail in a slidable manner. The second sliding portion is engaged with the second slide rail in the slidable manner. The first slide rail and the second slide rail are crossed and disposed on the seat base, and the seat body is connected with the first sliding portion and the second sliding portion. The seat body is slid relative to the seat base via assembly of the sliding portions and the slide rails. The foresaid assembly has advantages of simple structure, practical function and convenient repair.

According to the claimed invention, the rotation component further includes a connecting portion. An end of the connecting portion is pivotally connected to the first sliding portion, and the other end of the connecting portion is pivotally connected to the second sliding portion. The first sliding portion and second sliding portion can be slide relative to each other via the connecting portion.

According to the claimed invention, the first slide rail and the second slide rail are disposed on a top surface of the seat base.

According to the claimed invention, an installation slot is formed on the top surface of the seat base, and the first slide rail and the second slide rail are disposed inside the installation slot. A height of the seat body relative to the carrier is decreased by accommodating the first slide rail and the second slide rail inside the installation slot; the first slide rail and the second slide rail are hidden to compact all members in the rotatable safety seat.

According to the claimed invention, an opening is formed on a crossed section between the first slide rail and the second slide rail. The first sliding portion passes over the second slide rail via the opening, and the second sliding portion passes over the first slide rail via the opening. The opening 40 is a rectangular form.

According to the claimed invention, a length of the first sliding portion and a length of the second sliding portion are greater than a length or a width of the opening. When the first sliding portion and the second sliding portion pass through the opening, the first sliding portion is not slid into the second slide rail, and the second sliding portion is not slid into the first slide rail. The first sliding portion and the second sliding portion do not stay in the same slide rail, and accordingly the seat body can be shifted and rotated at the same time. Dimensional design of the opening and the sliding portions allows the first sliding portion and the second sliding portion to pass through the opening smoothly. At least a part of a lateral surface of the first sliding portion abuts against the first slide rail when the first sliding portion passes through the opening. At least a part of a lateral surface of the second sliding portion abuts against the second slide rail when the second sliding portion passes through the opening.

According to the claimed invention, an interval between the first movable end and the second movable end is smaller than or equal to an interval between the opening and one end of the installation slot. When one of the first sliding portion and the second sliding portion arrives the opening or is moved close to the opening, the seat body faces to one of a front side, a rear side, a right side and a left side of the seat base, and the foresaid sliding portion which is nearby the opening is constrained by the corresponding slide rail or a lateral surface of the installation slot for brakes, to prevent the seat body from being continuously slid to one of the front side, the rear side, the right side and the left side of the seat base. If the interval between the first movable end and the second movable end is equal to the interval between the opening and one end of the installation slot, motion of the first sliding portion and the second sliding portion are simultaneously constrained when the seat body faces one of the front side, the rear side, the right side and the left side of the seat base, so as to stably brake the seat body.

According to the claimed invention, the first slide rail and the second slide rail are crossed as a cruciform.

According to the claimed invention, the seat body includes a seat portion and a back portion. The back portion is connected to the seat portion, and the seat portion is slidably connected to the seat base via the rotation component.

According to the claimed invention, a carrier includes a carrier body, a seat base and a rotatable safety seat. The rotatable safety seat includes a seat body and a rotation component. The seat base is engaged with the carrier body. The seat body is detachably connected to the seat base. The rotation component is engaged with the seat body and slidably connected on the seat body and the seat base. The seat body is shifting and rotating on the base via a sliding movement of the rotation component.

According to the claimed invention, the carrier is a vehicle, a stroller or a dining chair.

According to the claimed invention, the seat base is detachably connected to the carrier body via an ISOFIX structure or a latch structure.

Comparing to the prior art, the seat body is slidably connected to the seat base via the rotation component, so that the seat body is slid relative to the seat base by pushing the seat body of the present invention. During the slide of the seat body relative to the seat base, the seat body is shifted because of the foresaid slide, to move the seat body close to or away from any fixed portion of the seat base; in the meantime, the seat body is rotated when being shifted, so that the infant or the child on the seat body can be moved close to or away from the caretaker according to the actual demand. When the rotatable safety seat of the present invention is disposed on the carrier body, the caretaker pushes the seat body to move the infant or the child close to or away from the caretaker according to the actual demand, and then the caretaker can conveniently execute next action, such as adjusting transportation space of the child, or holding the child in the arms, or playing with the child.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
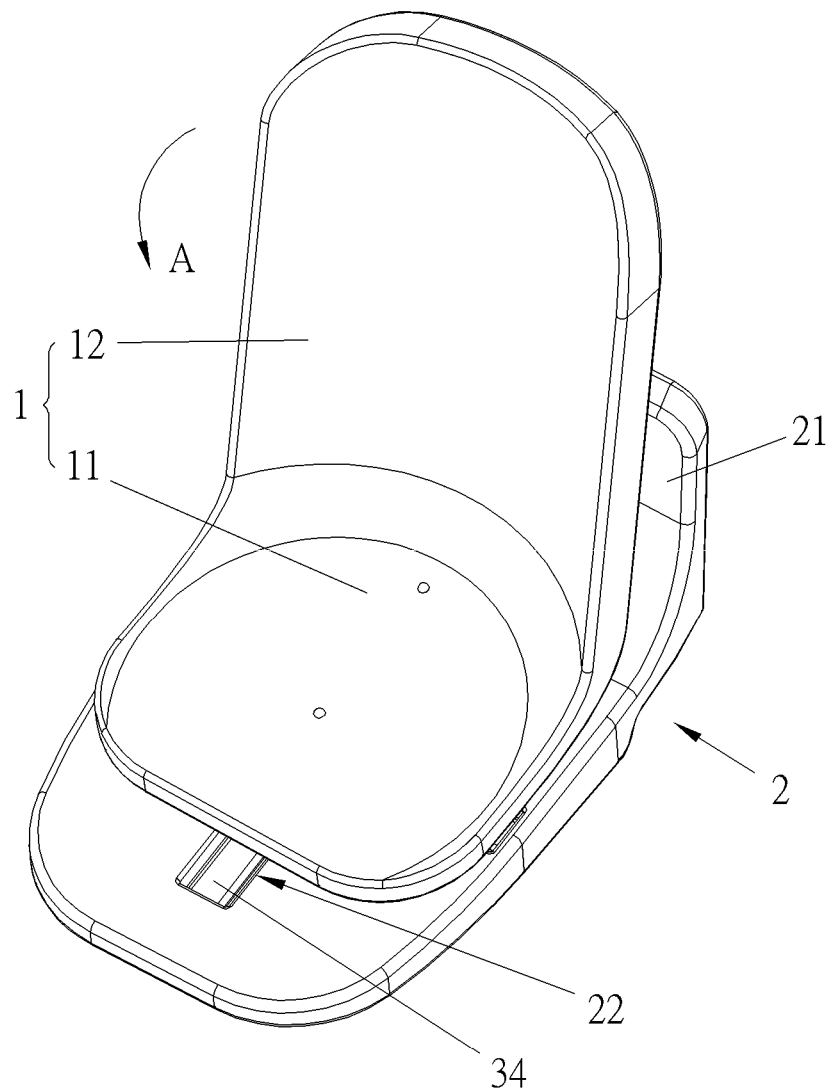
FIG. 1 is a diagram of a rotatable safety seat according to an embodiment of the present invention.

Please refer to FIG. 1. A carrier of the present invention can include a carrier body and a rotatable safety seat 100. The carrier and the carrier body are not shown in the figures. The rotatable safety seat 100 can include a seat body 1 and a seat base 2. The seat base 2 can be detachably engaged with the carrier body, or can be formed as a part of the carrier body. The carrier body can be an apparatus with a movable function, such as a vehicle or a stroller; the carrier body further can be the apparatus with a supporting function, such as a dining chair or a bassinet. The seat base 2 can be detachably connected to the carrier body via an ISOFIX structure or a latch structure; further, the seat base 2 may be detachably connected to the carrier body via a vehicle belt or any buckling structure. Therefore, the rotatable safety seat 100 can be easily and conveniently assembled with the conventional carrier body for an infant or a child.

Please refer to FIG. 1 to FIG. 6. The rotatable safety seat 100 of the present invention can include a seat body 1, seat base 2 and a rotation component 3. The seat body 1 can be engaged with the rotation component 3, and the rotation component 3 can be slidably connected on the seat base 2, so the seat body 1 can be detachably connected to the seat base 2. The seat body 1 can be shifting and rotating on the seat base 2 via a sliding movement of the rotation component 3. If the seat body 1 is pushed, the seat body 1 can be slid relative to the seat base 2. During a slide of the seat body 1 relative to the seat base 2, a position of the seat body 1 can be changed for shifting due to the slide, so that the infant or the child on the seat body 1 can be moved close to or away from a caretaker in accordance with an actual demand. The seat body 1 can include a seat portion 11 and a back portion 12. The back portion 12 can be connected to the seat portion 11. The seat portion 11 can be slidably connected to the seat base 2 via the rotation component 3.

Figure 1A:
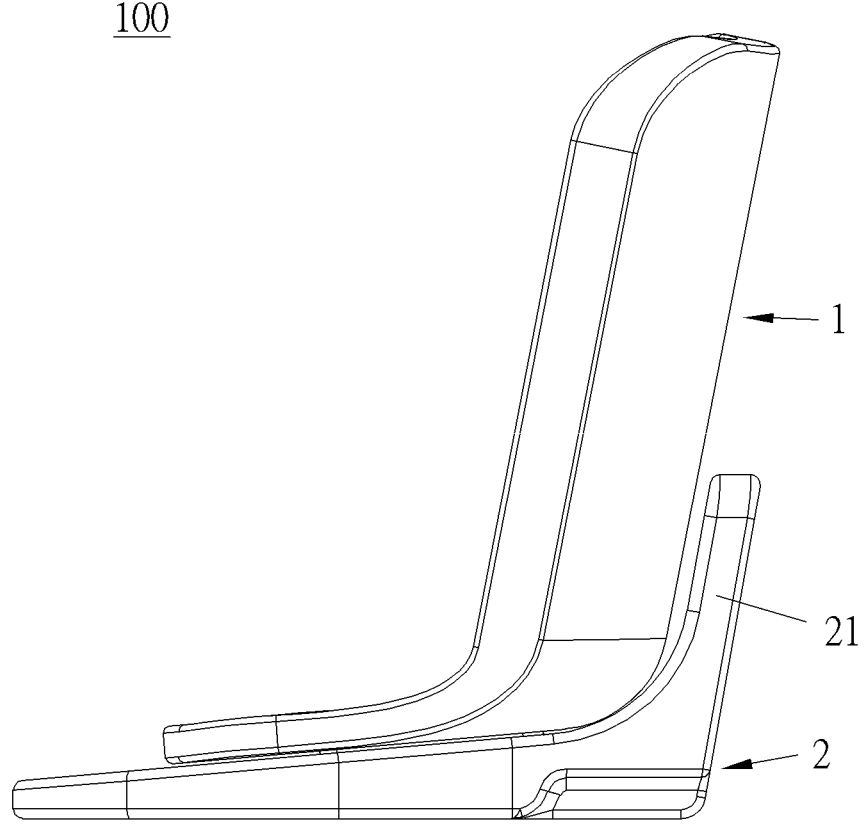
FIG. 1A is a side view of the rotatable safety seat according to the embodiment of the present invention.

As shown in FIG. 1 and FIG. 1A, the back portion 12 of the seat body 1 can be close to a supporting portion 21 stretched from the seat base 2. If the seat body 1 is pushed along an arrow A shown in FIG. 1, the seat body 1 can be slid away from the supporting portion 21 and further rotated in a direction along the arrow A (such as a counterclockwise direction) during the slide. The seat body 1 can be shifted and rotated to switch into a laterally facing state shown in FIG. 3, such as facing the right. If the seat body 1 in a state shown in FIG. 1 is pushed in one direction opposite to the arrow A, the seat body 1 can be slid and rotated to another laterally facing state for facing the left (which is opposite to the state shown in FIG. 3 and not shown in the figures). If the seat body 1 is in the state shown in FIG. 3, the seat body 1 can be pushed in a direction along an arrow A' (which is opposite to the arrow A), and the seat body 1 can be slid and rotated to switch into the state shown in FIG. 1; therefore, the seat body 1 of the present invention can be switched between the states shown in FIG. 1 and FIG. 3 in an obverse manner or in a reverse manner.

Figure 3:
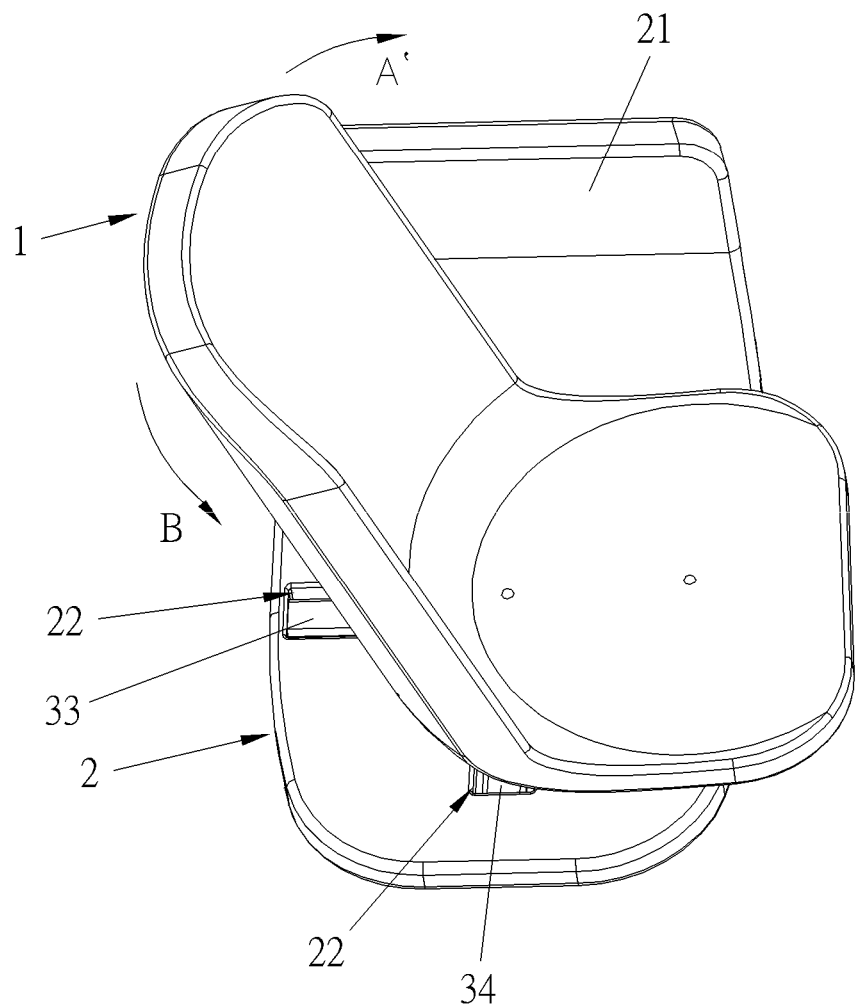
FIG. 3 is a diagram of the rotatable safety seat rotated in one direction according to the embodiment of the present invention.

As shown in FIG. 3, the back portion 12 of the seat body 1 can be positioned at the left side of the seat base 2. If the seat body 1 is pushed along an arrow B shown in FIG. 3, the seat body 1 can be slid toward the direction away from the supporting portion 21, and further rotated in a direction along the arrow B (such as the counterclockwise direction) during the slide. The seat body 1 can be slid and rotated to a state of being away from the supporting portion 21 shown in FIG. 5. As the seat body 1 is in the state shown in FIG. 5, the seat body 1 can be pushed along an arrow C (which is opposite to the arrow B), and the seat body 1 can be slid and rotated to the state shown in FIG. 3. Thus, the seat body 1 of the present invention can be switched between the states shown in FIG. 3 and FIG. 5 in an obverse manner or in a reverse manner.

Figure 5:
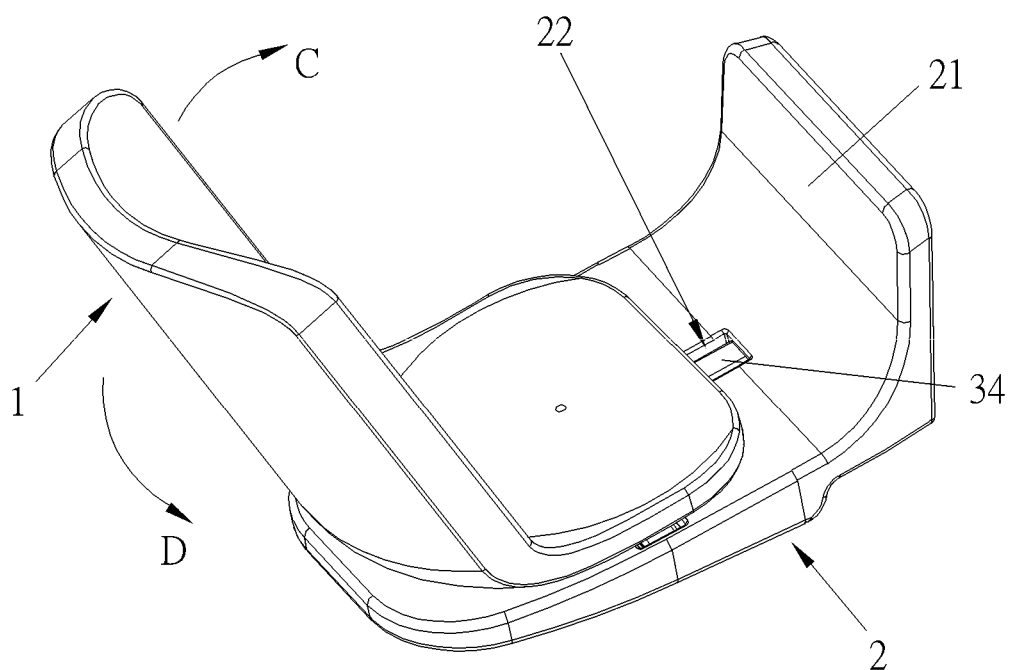
FIG. 5 is a diagram of the rotatable safety seat rotated in another direction according to the embodiment of the present invention.

As shown in FIG. 5, the seat body 1 can be set in the state of being away from the supporting portion 21. If the seat body 1 is pushed along an arrow D shown in FIG. 5, the seat body 1 can be slide and gradually close to the supporting portion 21, and further rotated along the arrow D (such as the counterclockwise direction) during the slide. The seat body 1 can be slid and rotated to the state of facing the left, which is opposite to the state shown in FIG. 3 and not shown in the figures. If the seat body 1 is in the foresaid state opposite to the state shown in FIG. 3, the seat body 1 can be continuously pushed in the counterclockwise direction, and the seat body 1 can be slid and rotated to the state shown in FIG. 1; that is to say, the seat body 1 of the present invention can be switched between the states shown in FIG. 1 and FIG. 5 in an obverse manner or in a reverse manner.

When the seat body 1 is slid and rotated to the state of facing the right shown in FIG. 3, or slid and rotated to the state of facing the left opposite to the state shown in FIG. 3, the seat body 1 can be close to the lateral side of the carrier or position of the caretaker, and the caretaker can hug and take care of the infant or the child conveniently. When the seat body 1 is slid and rotated to the state shown in FIG. 1, the back portion 12 of the seat body 1 can be close to the supporting portion 21 of the seat base 2, and the seat base 2 can be protruded from the seat body 1, so the child can put feet on the seat base 2 comfortably. When the seat body 1 is slid and rotated to the state shown in FIG. 5, the back portion 12 of the seat body 1 can be away from the supporting portion 21 of the seat base 2, and a front surface of the seat body 1 can face the seat base 2; meanwhile, space between the back portion 12 of the seat body 1 and the supporting portion 21 of the seat base 2 can be maximized for the feet of the child.

Figure 2:
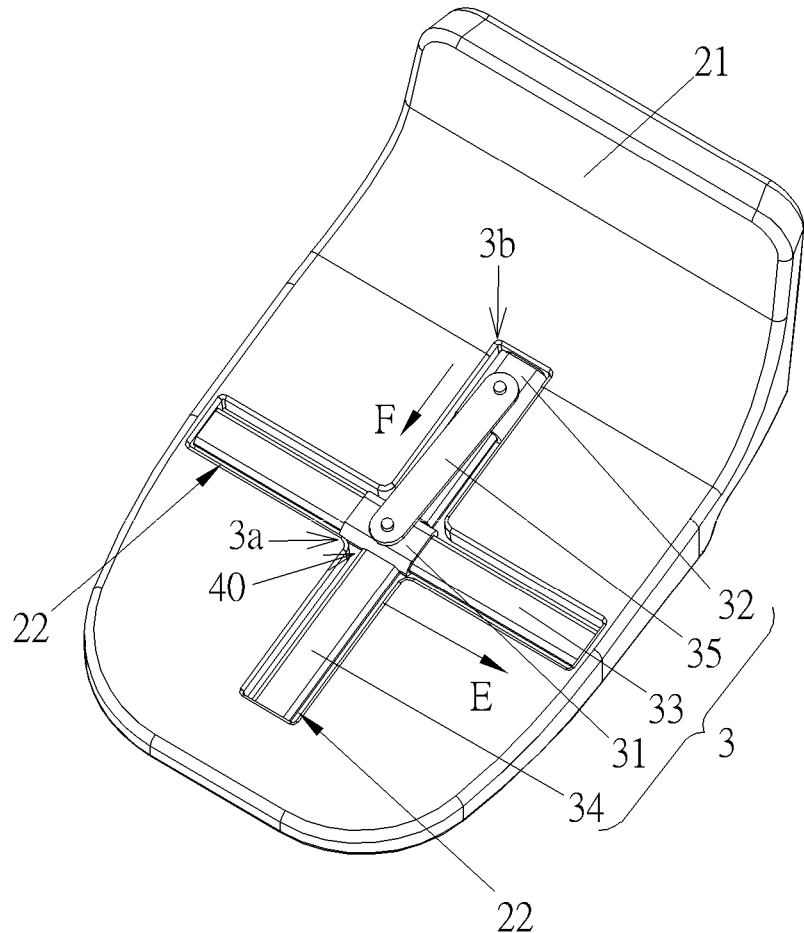
FIG. 2 is a diagram of the rotatable safety seat without a seat body according to the embodiment of the present invention.
Figure 4:
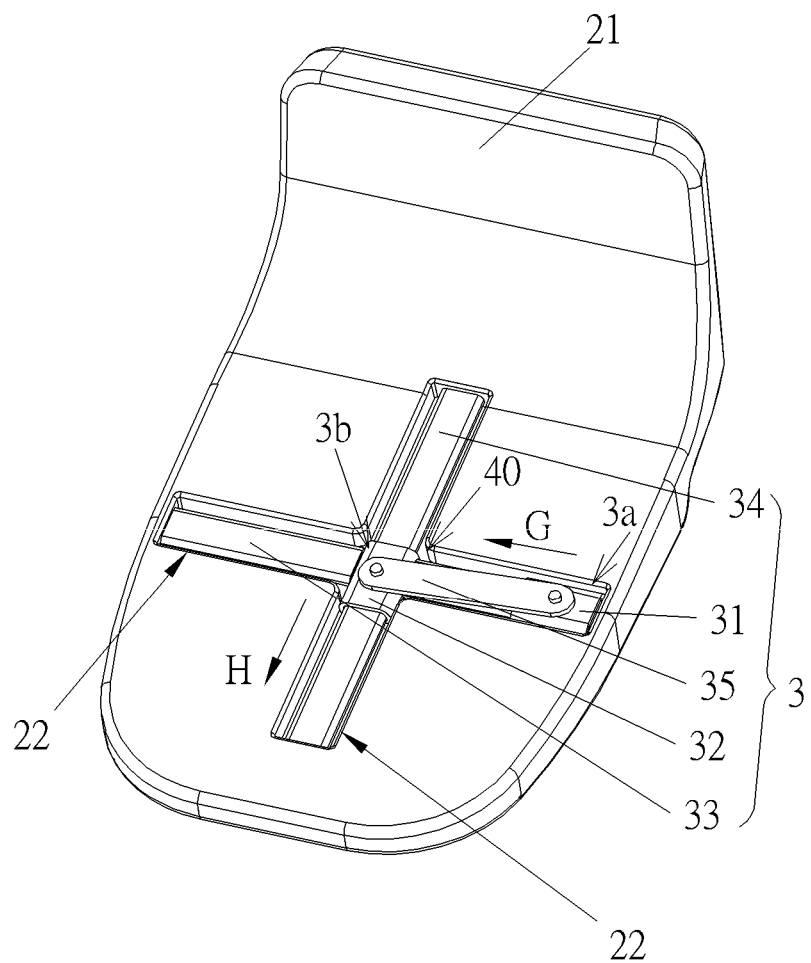
FIG. 4 is a diagram of the rotatable safety seat without the seat body and rotated in one direction according to the embodiment of the present invention.
Figure 6:
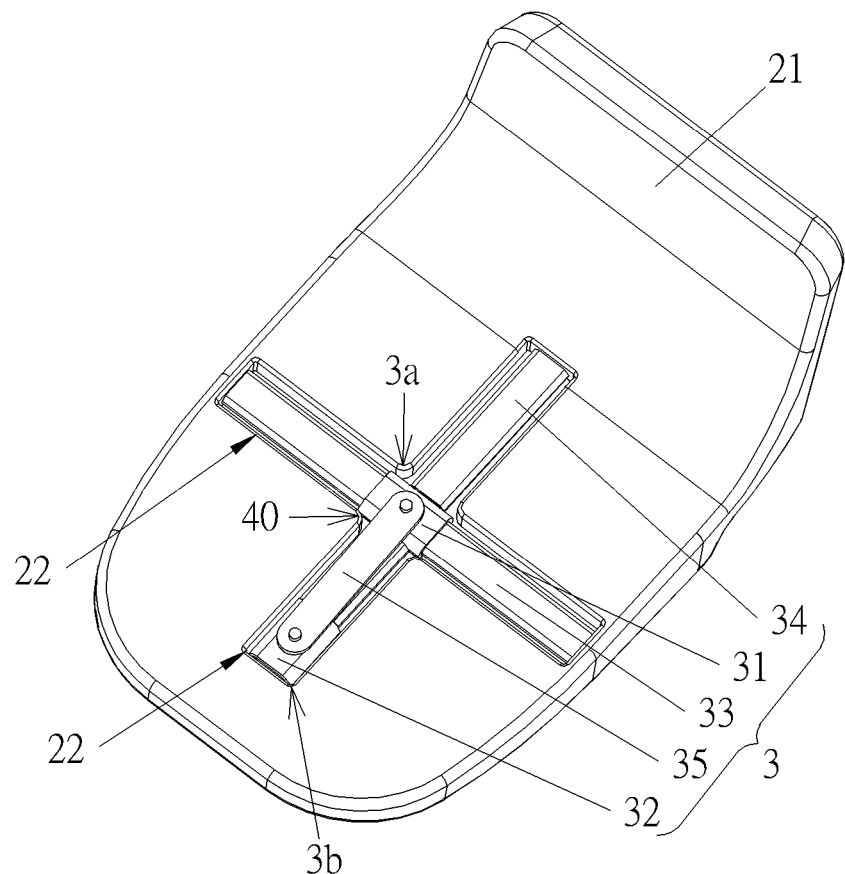
FIG. 6 is a diagram of the rotatable safety seat without the seat body and rotated in another direction according to the embodiment of the present invention.

As shown in FIG. 2, FIG. 4 and FIG. 6, the rotation component 3 of the present invention can include a first movable end 3a and a second movable end 3b linked with and spaced from each other. The seat body 1 can be slidably connected to the seat base 2 via engaging with the first movable end 3a and the second movable end 3b. The first movable end 3a and the second movable end 3b are linked but not close neighbors, which means the first movable end 3a can be spaced from the second movable end 3b, so that the slide of the seat body 1 relative to the seat base 2 can provide stable and smooth reliability. The first sliding portion 31 can be disposed on the seat base 2 in a slidable manner to form the first movable end 3a. The second sliding portion 32 can be disposed on the seat base 2 in the slidable manner to form the second movable end 3b. The first sliding portion 31 can be linked with the second sliding portion 32, so that relative connection between the first sliding portion 31 and the second sliding portion 32 can drive motion of the seat body 1, such as shifting and rotation of the seat body 1. The first sliding portion 31 and the second sliding portion 32 can be, but not limited to, any slidable members, such as slide blocks and a slide rollers.

As further shown in FIG. 2, FIG. 4 and FIG. 6, a motion path of the first movable end 3a can be crossed by a motion path of the second movable end 3b. Due to crossed design of the motion paths, the first movable end 3a and the second movable end 3b which are linked can be simply and practically rotated and slid when passing through a crossed section between the two motion paths. The motion paths of the first movable end 3a and the second movable end 3b can be crossed as a cruciform, and therefore a movement track of the seat body 1 can be an elliptic form, so as to rotate the seat body 1 when being slidably shifted.

As further shown in FIG. 2, FIG. 4 and FIG. 6, the first sliding portion 31 can be engaged with the seat base 2 in the slidable manner, and the second sliding portion 32 can be engaged with the seat base 2 in the slidable manner.

As further shown in FIG. 2, FIG. 4 and FIG. 6, the rotation component 3 of the present invention can further include a first slide rail 33 and a second slide rail 34. The first sliding portion 31 can be engaged with the first slide rail 33 in the slidable manner, and the second sliding portion 32 can be engaged with the second slide rail 34 in the slidable manner. The first slide rail 33 and the second slide rail 34 can be crossed and disposed on the seat base 2. The seat body 1 can be connected to the first sliding portion 31 and the second sliding portion 32. Slide of the first sliding portion 31 inside the first slide rail 33 and slide of the second sliding portion 32 inside the second slide rail 34 can shift and rotate the seat body 1 relative to the seat base 2. The seat body 1 can be slid relative to the seat base 2 via assembly of the first sliding portion 31, the second sliding portion 32, the first slide rail 33 and the second slide rail 34. The foresaid assembly has advantages of simple structure, practical function and convenient repair.

As shown in FIG. 2, the back portion 12 of the seat body 1 can be moved close to the supporting portion 21, and the seat body 1 of the rotatable safety seat 100 can be detached and not shown in FIG. 2. As the seat body 1 is in the state shown in FIG. 1, the seat body 1 can be pushed along the arrow A, and the first sliding portion 31 can be slid relative to the first slide rail 33 along an arrow E and the second sliding portion 32 can be slid relative to the second slide rail 34 along an arrow F, so the rotation component 3 can be moved to the state shown in FIG. 4. An end of a connecting portion 35 can be pivotally connected to the first sliding portion 31, and the other end of the connecting portion 35 can be pivotally connected to the second sliding portion 32. During the slide of the first sliding portion 31 and the second sliding portion 32, the connecting portion 35 can be rotated in the counterclockwise direction; rotation of the connecting portion 35 can be simultaneous with rotation of the seat body 1, and the connecting portion 35 can be further shifted when being rotated; that is to say, the connecting portion 35 and the seat body 1 can be shifted when being rotated in the counterclockwise direction.

As shown in FIG. 4, the back portion 12 of the seat body 1 can be positioned at a lateral side of the rotatable safety seat 100, and the seat body 1 of the rotatable safety seat 100 can be detached and not shown in FIG. 4. As the seat body 1 is in the state shown in FIG. 3, the seat body 1 can be pushed along the arrow B, and the first sliding portion 31 can be slid relative to the first slide rail 33 along an arrow G and the second sliding portion 32 can be slid relative to the second slide rail 34 along an arrow H, so the rotation component 3 can be moved to the state shown in FIG. 6. During the slide of the first sliding portion 31 and the second sliding portion 32, the connecting portion 35 can be rotated in the counterclockwise direction, and the rotation of the connecting portion 35 can be simultaneous with the rotation of the seat body 1. The connecting portion 35 can be further shifted when being rotated; that is to say, the connecting portion 35 and the seat body 1 can be shifted when being rotated in the counterclockwise direction.

As shown in FIG. 1 to FIG. 6, the first slide rail 33 and the second slide rail 34 of the present invention can be disposed on a top surface of the seat base 2. The top surface of the seat base 2 can have an installation slot 22, and the first slide rail 33 and the second slide rail 34 can be disposed inside the installation slot 22. A height of the seat body 1 relative to the carrier can be decreased by accommodating the first slide rail 33 and the second slide rail 34 inside the installation slot 22; the first slide rail 33 and the second slide rail 34 can be hidden to compact all members in the rotatable safety seat 100.

In one possible embodiment, an opening 40 can be formed on the crossed section between the first slide rail 33 and the second slide rail 34, so the first sliding portion 31 can pass over the second slide rail 34 and the second sliding portion 32 can pass over the first slide rail 33. The opening 40 may be a rectangular form, and a length of the first sliding portion 31 and a length of the second sliding portion 32 can be greater than a length or a width of the opening 40. When the first sliding portion 31 and the second sliding portion 32 pass through the opening 40, the first sliding portion 31 cannot be slid into the second slide rail 34 and the second sliding portion 32 cannot be slid into the first slide rail 33. The first sliding portion 31 and the second sliding portion 32 do not stay in the same slide rail, and accordingly the seat body 1 can be shifted and rotated at the same time. Dimensional design of the opening 40, the first sliding portion 31 and the second sliding portion 32 can allow the first sliding portion 31 and the second sliding portion 32 to pass through the opening 40 smoothly. At least a part of a lateral surface of the first sliding portion 31 can abut against the first slide rail 33 when the first sliding portion 31 passes through the opening 40. At least a part of a lateral surface of the second sliding portion 32 can abut against the second slide rail 34 when the second sliding portion 32 passes through the opening 40.

Moreover, an interval between the first movable end 3a and the second movable end 3b can be smaller than or equal to an interval between the opening 40 and one end of the installation slot 22. When one of the first sliding portion 31 and the second sliding portion 32 arrives the opening 40 or is moved close to the opening 40, the seat body 1 can face to one of a front side, a rear side, a right side and a left side of the seat base 2, and the foresaid sliding portion which is nearby the opening 40 can be constrained by the corresponding slide rail or a lateral surface of the installation slot 22 for brakes, to prevent the seat body 1 from being continuously slid to one of the front side, the rear side, the right side and the left side of the seat base 2. If the interval between the first movable end 3a and the second movable end 3b is equal to the interval between the opening 40 and one end of the installation slot 22, motion of the first sliding portion 21 and the second sliding portion 32 can be simultaneously constrained when the seat body 1 faces one of the front side, the rear side, the right side and the left side of the seat base 2, so as to stably brake the seat body 1.

As shown in FIG. 2, FIG. 4 and FIG. 6, the first slide rail 33 and the second slide rail 34 of the present invention can be crossed as the cruciform. In the present invention, a structurally vertical direction of the second slide rail 34 can be defined as being parallel to a moving direction of the carrier, such as a front way or a rear way of the vehicle. When the first slide rail 33 and the second slide rail 34 are crossed as the cruciform, the seat body 1 can be automatically blocked when the seat body 1 is moved relative to the seat base 2 and arrives one of the states shown in the figures, and then the caretaker can easily install the rotatable safety seat 100 and take care of the child.

In another possible embodiment, the rotation component 3 may include several spiral rails or several elliptic rails and related slide blocks, which are not shown in the figures. The seat body 1 can be shifted and rotated simultaneously via the spiral rails and the related slide blocks or via the elliptic rails and the related slide blocks when the seat body 1 is slid relative to the seat base 2.

As shown in FIG. 1 to FIG. 6, the seat body 1 can be slidably connected to the seat base 2 via the rotation component 3, so that the seat body 1 can be slid relative to the seat base 2 by pushing the seat body 1 of the present invention. During the slide of the seat body 1 relative to the seat base 2, the seat body 1 can be shifted because of the foresaid slide, to move the seat body 1 close to or away from any fixed portion of the seat base 2; in the meantime, the seat body 1 can be rotated when being shifted, so that the infant or the child on the seat body 1 can be moved close to or away from the caretaker according to the actual demand. When the rotatable safety seat 100 of the present invention is disposed on the carrier body, the caretaker can push the seat body 1 to move the infant or the child close to or away from the caretaker according to the actual demand, and then the caretaker can conveniently execute next action, such as adjusting transportation space of the child, or holding the child in the arms, or playing with the child.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A rotatable safety seat, comprising:
   a seat body;
   a seat base; and
   a rotation component being engaged with the seat body and slidably connected on the seat base;
   wherein the rotation component further comprises a first slide rail and a second slide rail crossed as a cruciform in the same level, the seat body is shifting and rotating on the seat base via the first slide rail and the second slide rail of the rotation component.

2. The rotatable safety seat of claim 1, wherein the seat body comprises a seat portion and a back portion, the back portion is connected to the seat portion, and the seat portion is slidably connected to the seat base via the rotation component.

3. The rotatable safety seat of claim 1, wherein the rotation component comprises a first movable end and a second movable end linked with and spaced from each other, the seat body is slidably connected with the seat base via engaging with the first movable end and the second movable end.

4. The rotatable safety seat of claim 3, wherein a motion path of the first movable end is crossed by a motion path of the second movable end.

5. The rotatable safety seat of claim 3, wherein the rotation component comprises a first sliding portion and a second sliding portion, the first sliding portion is slidably disposed on the seat base to be the first movable end, the second sliding portion is slidably disposed on the seat base to be the second movable end, and the first sliding portion is linked with the second sliding portion.

6. The rotatable safety seat of claim 5, wherein the second sliding portion is engaged with the seat base in a slidable manner.

7. The rotatable safety seat of claim 5, wherein the first sliding portion is engaged with the seat base in a slidable manner.

8. The rotatable safety seat of claim 5, wherein the rotation component further comprises a connecting portion, an end of the connecting portion is pivotally connected to the first sliding portion, and the other end of the connecting portion is pivotally connected to the second sliding portion.

9. The rotatable safety seat of claim 5, wherein the first sliding portion is engaged with the first slide rail in a slidable manner, the second sliding portion is engaged with the second slide rail in the slidable manner, the first slide rail and the second slide rail are disposed on the seat base, and the seat body is connected with the first sliding portion and the second sliding portion.

10. The rotatable safety seat of claim 9, wherein an installation slot is formed on the top surface of the seat base, and the first slide rail and the second slide rail are disposed inside the installation slot.

11. The rotatable safety seat of claim 9, wherein the first slide rail and the second slide rail are disposed on a top surface of the seat base.

12. The rotatable safety seat of claim 9, wherein an opening is formed on a crossed section between the first slide rail and the second slide rail.

13. The rotatable safety seat of claim 12, wherein an interval between the first movable end and the second movable end is smaller than or equal to an interval between the opening and one end of the installation slot.

14. The rotatable safety seat of claim 12, wherein a length of the first sliding portion and a length of the second sliding portion are greater than a length or a width of the opening.

* * * * *